(12) United States Patent
Mu

(10) Patent No.: US 12,244,426 B2
(45) Date of Patent: Mar. 4, 2025

(54) DATA TRANSMISSION METHOD AND APPARATUS, AND STORAGE MEDIUM

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 406 days.

(21) Appl. No.: 17/774,087

(22) PCT Filed: Nov. 4, 2019

(86) PCT No.: PCT/CN2019/115421
§ 371 (c)(1),
(2) Date: May 3, 2022

(87) PCT Pub. No.: WO2021/087688
PCT Pub. Date: May 14, 2021

(65) Prior Publication Data
US 2022/0376835 A1    Nov. 24, 2022

(51) Int. Cl.
| | |
|---|---|
| *H04L 1/1812* | (2023.01) |
| *H04L 1/00* | (2006.01) |
| *H04L 1/08* | (2006.01) |
| *H04L 5/14* | (2006.01) |

(52) U.S. Cl.
CPC .......... *H04L 1/1812* (2013.01); *H04L 1/0025* (2013.01); *H04L 1/08* (2013.01); *H04L 5/14* (2013.01)

(58) Field of Classification Search
CPC ....... H04L 1/1812; H04L 1/0025; H04L 1/08; H04L 5/14; H04L 1/1825; H04L 1/1896; H04L 1/1854; H04L 5/0055; H04L 1/1607; H04L 1/1829; H04L 5/0094; H04W 4/70

See application file for complete search history.

(56) References Cited

U.S. PATENT DOCUMENTS

| | | | |
|---|---|---|---|
| 2014/0098780 A1 | 4/2014 | Kim et al. | |
| 2015/0341915 A1* | 11/2015 | Lyu | H04W 72/04 370/277 |
| 2019/0014494 A1 | 1/2019 | Dinan | |
| 2020/0280397 A1* | 9/2020 | Gao | H04L 5/0055 |
| 2021/0204282 A1* | 7/2021 | Lee | H04W 72/0446 |
| 2021/0314084 A1* | 10/2021 | Hwang | H04L 1/1819 |

FOREIGN PATENT DOCUMENTS

| | | |
|---|---|---|
| CN | 108809534 A | 11/2018 |
| CN | 109314849 A | 2/2019 |
| CN | 110268662 A | 9/2019 |
| WO | 2018/193777 A1 | 10/2018 |

OTHER PUBLICATIONS

"TSG Report to TSG", 3GPP TSG RAN meeting #75, Dubrovnik, Croatia, Mar. 6-9, 2017 (RP-170462) (Year: 2017).*

* cited by examiner

*Primary Examiner* — Sun Jong Kim
(74) *Attorney, Agent, or Firm* — Volpe Koenig

(57) ABSTRACT

A data transmission method is disclosed and described herein. The method includes: determining configuration information of a multi-transmission-block (TB) alternate transmission according to a hybrid automatic repeat request (HARQ) feedback binding configuration; and on the basis of the configuration information, using the multi-TB alternate transmission to send a TB.

16 Claims, 9 Drawing Sheets

DATA TRANSMISSION METHOD AND APPARATUS, AND STORAGE MEDIUM

CROSS REFERENCE TO RELATED APPLICATION

The present application is a U.S. National Stage of International Application No. PCT/CN2019/115421, filed on PCT Nov. 4, 2019, the contents of all of which are incorporated herein by reference in their entireties for all purposes.

BACKGROUND

A Machine Type Communication (MTC) technology is a typical representative of a cellular Internet of Things technology. At present, MTC is widely applied to a smart city, for example, meter reading; intelligent agriculture, for example, collection of information such as temperature and humidity; and intelligent transportation, for example, various fields such as bicycle sharing.

As for an MTC system, a 3rd Generation Partnership Project (GPP) release 16 proposes continuous scheduling of a plurality of uplink or downlink transmission blocks (TBs) by using a MTC Physical Downlink Control Channel (MPDCCH), which is called multi-TB scheduling.

SUMMARY

The present application relates to the technical field of wireless communication and is not limited to the technical field of wireless communication, in particular to a data transmission method and apparatus, and a non-transitory computer-readable storage medium.

According to a first aspect of the present disclosure, a data transmission method is provided, is applied to a base station, and includes:

determining configuration information of multi-TB alternate transmission according to a HARQ bundling configuration; and using the multi-TB alternate transmission to send a TB on the basis of the configuration information.

According to a second aspect of the present disclosure, a data transmission method is provided, is applied to user equipment and includes:

receiving a TB issued by using the multi-TB alternate transmission, where configuration information of the multi-TB alternate transmission is determined according to an HARQ bundling configuration.

According to a third aspect of the present disclosure, a data transmission apparatus is provided and includes a processor, a memory and an executable program stored in the memory and capable of being run by the processor, in response to determining that the executable program is run, the processor executes:

determining configuration information of multi-transmission block (TB) alternate transmission according to a hybrid automatic repeat request (HARQ) bundling configuration; and using the multi-TB alternate transmission to send a TB on the basis of the configuration information.

According to a fourth aspect of the present disclosure, a data transmission apparatus is provided and includes a processor, a memory and an executable program stored in the memory and capable of being run by the processor, in response to determining that the executable program is run, the processor executes steps of the data transmission method in the second aspect.

According to a fifth aspect of the present disclosure, a non-transitory computer-readable storage medium is provided and stores an executable program, in response to determining that the executable program is executed by the processor, implements steps of the data transmission method in the first aspect.

According to a sixth aspect of the present disclosure, a non-transitory computer-readable storage medium is provided and stores an executable program, in response to determining that the executable program is executed by the processor, implements steps of the data transmission method in the second aspect.

It should be understood that the above general description and the following detailed description are only examples and are explanatory instead of limiting the examples of the present disclosure.

BRIEF DESCRIPTION OF THE DRAWINGS

Accompanying drawings here, which are incorporated in and constitute a part of the specification, illustrate examples consistent with the present disclosure and, together with the specification, serve to explain principles of the examples of the present disclosure.

DETAILED DESCRIPTION

Figure 1:
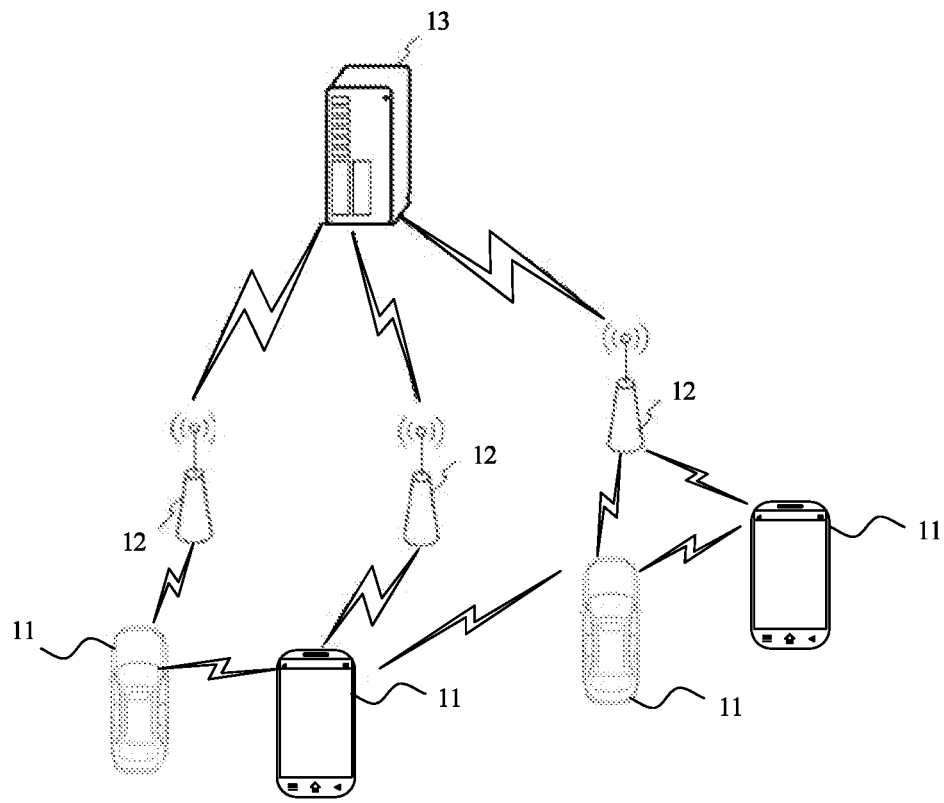
FIG. 1 is a schematic structural diagram of a wireless communication system shown according to an example of the present disclosure.

The examples will be described in detail here and are shown in the drawings. Unless otherwise indicated, when the following description refers to the drawings, the same number in the different drawings represents the same or similar element. Implementations described in the following examples do not represent all implementations consistent with the examples of the present disclosure. Rather, they are only examples of an apparatus and method consistent with some aspects of the examples of the present disclosure as detailed in appended claims.

Terms used in the examples of the present disclosure are only intended to describe specific examples instead of limiting the examples of the present disclosure. The singular such as "a/an" and "the" used in the examples of the present disclosure and appended claims intends to include a plural form unless other meanings are clearly indicated in context. It should be further understood that a term "and/or" used herein refers to and contains any one or all possible combinations of one or a plurality of associated listed items.

It should be understood that various information, possibly described by using terms such as first, second and third in the examples of the present disclosure, are not supposed to be limited to these terms. These terms are only used for distinguishing the same type of information. For example, without departing from the scope of the examples of the present disclosure, first information may be also called second information, and similarly, the second information may be also called the first information. Depending on the context, a word "if" used herein may be constructed as "when . . . " or "in response to determining".

As for multi-TB scheduling, the plurality of TBs can be transmitted in a mode of multi-TB alternate transmission. Transmission of the plurality of TBs is interleaved, and if there is a TB transmitted unsuccessfully, a Hybrid Automatic Repeat Request (HARQ) feedback will be sent. However, as for the plurality of TBs of scheduling at present, the multi-TB alternate transmission configuration mode is single, there is no setting specific to an actual communication mode of user equipment, so multi-TB alternate transmission cannot be matched with a communication mode of the user equipment, and a problem of transmission failure is caused.

Please refer to FIG. 1, which shows a schematic structural diagram of a wireless communication system provided by an example of the present disclosure. As shown in FIG. 1, the wireless communication system is a communication system based on a cellular mobile communication technology and may include: a plurality of terminals 11 and a plurality of base stations 12.

The terminals 11 may refer to a device providing a voice and/or data connectivity for a user. The terminals 11 may communicate with one or a plurality of core networks via a Radio Access Network (RAN). The terminals 11 may be an Internet of Things terminal, such as a sensor device, a mobile phone (or called "cell" phone) and a computer with the Internet of Things terminal, for example, may be a fixed, portable, pocket, hand-held, computer built-in or vehicle-mounted apparatus. For example, there are a Station (STA), a subscriber unit, a subscriber station, a mobile station, a mobile, a remote station, an access point, a remote terminal, an access terminal, a user terminal, a user agent, a user device, or user equipment (UE). Or the terminals 11 may also be a device of an unmanned aerial vehicle. Or the terminals 11 may also be a vehicle-mounted device, for example, may be a trip computer with a wireless communication function, or a wireless communication device externally connected with the trip computer. Or the terminal 11 may also be a road-side infrastructure, for example, may be a street lamp, signal lamp or other road-side infrastructures, etc. with a wireless communication function.

The base stations 12 may be a network side device in a wireless communication system. The wireless communication system may the 4th generation (4G) mobile communication system, also called a Long Term Evolution (LTE) system; or the wireless communication system may also be a 5G system, also called a new radio (NR) system or a 5G NR system. Or the wireless communication system may also be a next generation system of the 5G system. An access network in the 5G system may be called a New Generation-Radio Access Network (NG-RAN). Or it is an MTC system.

The base station 12 may be an evolution base station (eNB) adopted in a 4G system. Or the base station 12 may also be a base station (gNB) of a centralized distributed architecture in the 5G system. When the base station 12 adopts the centralized distributed architecture, the base station usually includes a central unit (CU) and at least two distributed units (DU). A protocol stack of a Packet Data Convergence Protocol (PDCP) layer, a Radio Link Control (RLC) layer and a Media Access Control (MAC) layer is arranged in the central unit, a Physical (PHY) layer protocol stack is arranged in the distributed units, and the examples of the present disclosure do not limit a specific implementation of the base station 12.

Wireless connection may be established between the base station 12 and the terminal 11 through a wireless radio. In different implementations, the wireless radio is a wireless radio based on a fourth generation (4G) mobile communication network technology standard, or the wireless radio is a wireless radio based on a fifth generation (5G) mobile communication network technology standard, for example, the wireless radio is a new radio, or the wireless radio may also be a wireless radio based on a next generation mobile communication network technology standard of 5G.

In some examples, an End to End (E2E) connection may also be established between the terminals 11. For example, there are scenarios of vehicle to vehicle (V2V) communication, vehicle to Infrastructure (V2I) communication and vehicle to pedestrian (V2P) communication in vehicle to everything (V2X) communication.

In some examples, the above wireless communication system may also contain a network management device 13.

The plurality of base stations 12 are connected with the network management device 13 respectively. The network management device 13 may be a core network device in a wireless communication system, for example, the network management device 13 may be a Mobility Management Entity (MME) in an Evolved Packet Core (EPC). Or the network management device may also be other core network devices, for example, a Serving GateWay (SGW), a Public Data Network GateWay (PGW), a Policy and Charging Rules Function (PCRF) unit or a Home Subscriber Server (HSS), etc. The examples of the present disclosure do not limit an implementation form of the network management device 13.

An executive body involved in the examples of the present disclosure includes but is not limited to: a MTC supporting terminal or base station.

Figure 2:
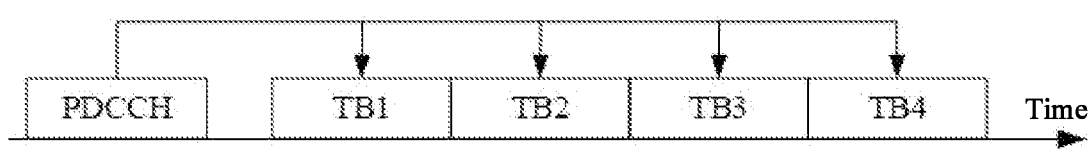
FIG. 2 is a schematic diagram of multi-TB scheduling shown according to an example of the present disclosure.

A disclosure scheme of the examples of the present disclosure is to perform continuous scheduling of a plurality of uplink or downlink TBs by using an MTC physical downlink control channel (MPDCCH) proposed by a 3GPP release 16 as for an MTC system, as shown in FIG. 2.

Figure 3:
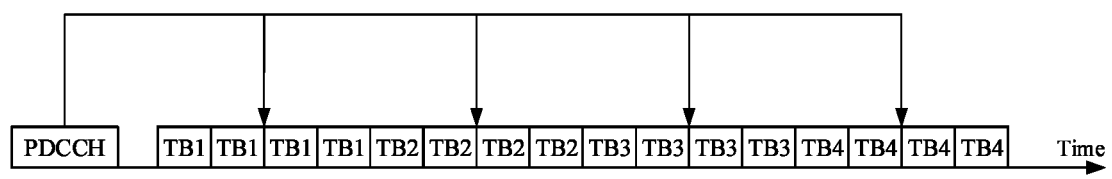
FIG. 3 is a schematic diagram of another multi-TB scheduling shown according to an example of the present disclosure.

A re-transmission mode may be adopted in multi-TB scheduling, and a specific scheduling form is shown in FIG. 3.

Figure 4:
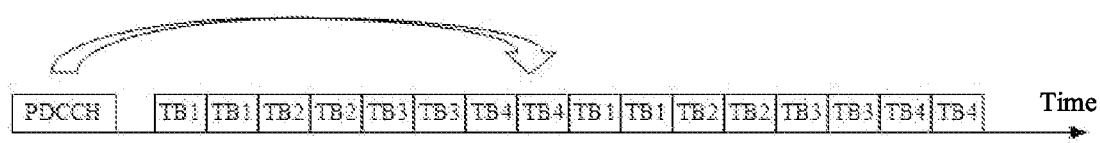
FIG. 4 is a schematic diagram of yet another multi-TB scheduling shown according to an example of the present disclosure.

In order to improve a time diversity effect and improve transmission efficiency, a mechanism of multi-TB alternate transmission is used in multi-TB scheduling, that is, different TBs are re-transmitted alternately, and a specific form is shown in FIG. 4. Meanwhile, in order to guarantee cross-subframe channel estimation and symbol combining gain, a plurality of re-transmissions may be contained in one multi-TB alternate transmission unit. The number of re-transmissions contained in the multi-TB alternate transmission unit may be defined as a size of the multi-TB alternate transmission unit.

In multi-TB scheduling, HARQ feedbacks specific to a plurality of TBs may be bound to a PUCCH (Frequency-division Duplex) resource to be transmitted. Multi-TB alternate transmission is performed on all scheduled TBs in the related art. Then feedbacks of the TBs of multi-TB alternate transmission are bound to be transmitted. Time delay of the HARQ feedbacks caused by this method is long, and meanwhile, there are a risk of collision of a plurality of PUCCHs.

Figure 5:
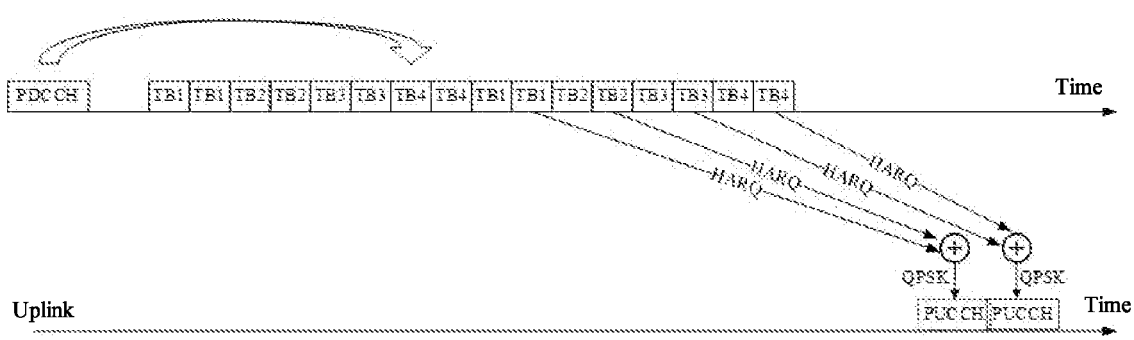
FIG. 5 is a schematic diagram of multi-TB scheduling HARQ bundling transmission according to an example of the present disclosure.

As shown in FIG. 5, a total of four TBs are scheduled in a PDCCH, a size of bundling of the HARQ feedbacks is 2, that is, HARQ feedbacks of the two different TBs are bound to one PUCCH resource to be transmitted, HARQ feedbacks of TB1 and TB2 are bound to one PUCCH resource to be transmitted, and HARQ feedbacks of TB3 and TB4 are bound to another PUCCH resource to be transmitted. TB1 to TB4 are in one multi-TB alternate transmission unit, so at the moment, transmission end time of TB1 to TB4 is close, the User Equipment (UE) almost needs to wait for near the end of TB4 so as to start transmission of the HARQ feedbacks, time delay is long, two other PUCCH resources are close in time domain, and overlapping of the time domain is prone to occurring.

In view of this, an example of the present disclosure provides a data transmission method and apparatus, and a non-transitory computer-readable storage medium.

Figure 6:
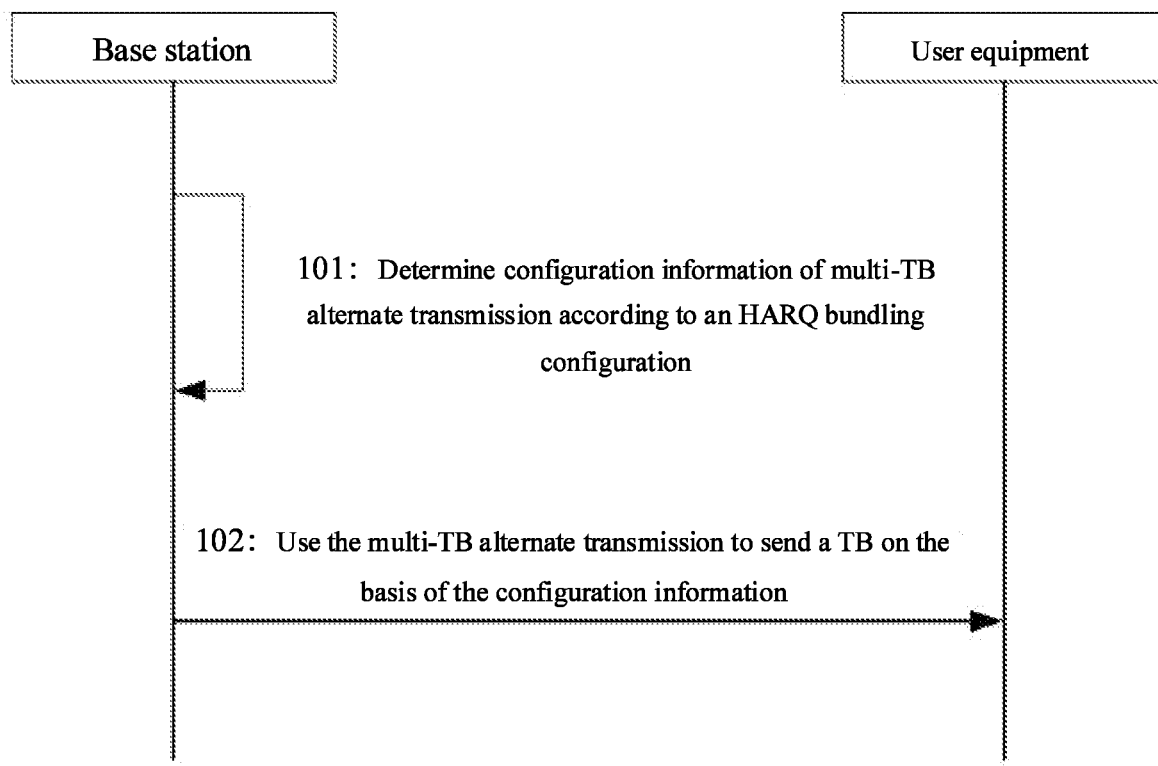
FIG. 6 is a schematic flowchart of a data transmission method shown according to an example of the present disclosure.

As shown in FIG. 6, an example provides a data transmission method, which is applicable to a base station of wireless communication and includes:

Step 101: configuration information of multi-TB alternate transmission is determined according to an HARQ bundling configuration; and step 102: a TB is sent by using the multi-TB alternate transmission on the basis of the configuration information.

HARQ bundling means that HARQ feedbacks of a plurality of TBs are bound to one PUCCH resource to be transmitted. The HARQ bundling configuration may include: the quantity of the HARQ feedbacks bound to the PUCCH resource to be transmitted etc.; or may include: configurating whether the HARQ feedbacks of the plurality of TBs are bound to the PUCCH resource to be transmitted. PUCCH may be MPUCCH in MTC.

The configuration information of the multi-TB alternate transmission includes: the quantity of TBs of one multi-TB alternate transmission, the number of re-transmissions of each TB in one multi-TB alternate transmission unit, the total number of re-transmissions of each TB, etc. In the multi-TB alternate transmission, the predetermined quantity of TBs may be set in one multi-TB alternate transmission unit to be transmitted, each TB may be re-transmitted for many times in the multi-TB alternate transmission unit, and the multi-TB alternate transmission unit is also transmitted for many times. So the total number of re-transmissions of each TB reaches the predetermined number.

Here, different configuration information of TB alternate transmission may be determined specific to different HARQ bundling configurations, or when the HARQ bundling configuration indicates not to perform HARQ bundling, corresponding configuration information of TB alternate transmission may be set.

For example, when the HARQ bundling configuration indicates not to bind the HARQ feedbacks of the plurality of TBs to the PUCCH resource to be transmitted, the total number of to-be-transmitted TBs may be determined to be the quantity of TBs of one multi-TB alternate transmission.

Accordingly, the configuration information of the multi-TB alternate transmission is determined according to the HARQ bundling configuration, the configured multi-TB alternate transmission can be adapted to a current HARQ bundling configuration, the probability of data transmission failure caused by no match between the multi-TB alternate transmission and the HARQ bundling configuration of the user equipment is reduced, and thus transmission efficiency is improved.

In an example, the method further includes: a duplex mode of user equipment is determined; and determining configuration information of multi-TB alternate transmission according to the HARQ bundling configuration includes: the configuration information of the multi-TB alternate transmission is determined according to the duplex mode of the user equipment and/or the HARQ bundling configuration.

Here, the duplex mode includes a Full Duplex Frequency-Division Duplex (FD-FDD) and a Half Duplex Frequency-Division Duplex (HD-FDD). The user equipment can transmit data at the same time by using different frequency domains in an uplink and a downlink in a full duplex frequency-division duplex mode. The half duplex frequency-division duplex can perform data transmission in the uplink or the downlink at the same time. The base station may determine a working mode of the user equipment according to report information of the user equipment.

For example, if the user equipment is in the FD-FDD mode, the uplink and the downlink can transmit data at the same time, the multi-TB alternate transmission and transmission of the HARQ feedback of the TB whose transmission is completed may be performed in the uplink and the downlink respectively, so multi-TB alternate transmission configuration suitable for performing the multi-TB alternate transmission and HARQ feedback transmission at the same time can be adopted.

According to the data transmission method, apparatus and storage medium provided by the examples of the present disclosure, the method, applied to the base station, includes: determining the configuration information of the multi-TB alternate transmission according to the duplex mode of the user equipment and/or the HARQ bundling configuration; and sending the TB by using the multi-TB alternate transmission on the basis of the configuration information. Accordingly, the configuration information of the multi-TB alternate transmission is determined according to the HARQ bundling configuration, the configured multi-TB alternate transmission can be adapted to a current HARQ bundling configuration, the probability of data transmission failure caused by no match between the multi-TB alternate transmission and the HARQ bundling configuration of the user equipment is reduced, and thus transmission efficiency is improved.

Accordingly, the configuration information of the multi-TB alternate transmission is determined according to the HARQ bundling configuration, the configured multi-TB alternate transmission can be adapted to a current communication mode, the probability of data transmission failure caused by no match between the multi-TB alternate transmission and the working mode in which the user equipment is located is reduced, and thus transmission efficiency is improved.

In an example, determining the configuration information of the multi-TB alternate transmission according to the duplex mode of the user equipment and/or the HARQ bundling configuration includes:

the quantity of TBs of one multi-TB alternate transmission is determined according to a size of HARQ feedbacks bound to the same PUCCH resource in response to determining that the user equipment is in a full duplex frequency division duplex (FD-FDD) mode and the HARQ bundling configuration indicates that the plurality of HARQ feedbacks are bound to the same physical uplink control channel (PUCCH) resource to be transmitted.

Here, the quantity of TBs of one multi-TB alternate transmission may be determined by an MTC supporting base station according to the size of the HARQ bundling. The size of the HARQ bundling may be determined to be the quantity of TBs of one multi-TB alternate transmission. The quantity of TBs of one multi-TB alternate transmission is the quantity of different TBs contained in the one multi-TB alternate transmission. Here, TB is a content block, and data contents contained in the different TBs are different.

The size of the HARQ bundling may refer to the quantity of the plurality of HARQ feedbacks bound to the same PUCCH resource to be transmitted, and the quantity of HARQ feedbacks corresponds to the quantity of TBs.

For example, the size of the HARQ bundling is 2, it indicates that the HARQ feedbacks of two different TBs are bound to one PUCCH resource to be transmitted. Here, the quantity of TBs of one multi-TB alternate transmission may be determined to be 2.

In an example, determining the configuration information of the multi-TB alternate transmission according to the duplex mode of the user equipment and/or the HARQ bundling configuration includes at least one of the follows:

the quantity of TBs of one multi-TB alternate transmission is determined on the basis of preconfigured indication information or the total quantity of to-be-transmitted TBs is determined to be the quantity of TBs of one multi-TB alternate transmission in response to determining that the user equipment is in a Half-Duplex Frequency Division Duplex (HD-FDD) mode; or the quantity of TBs of the one multi-TB alternate transmission is determined on the basis of the preconfigured indication information or the total quantity of to-be-transmitted TBs is determined to be the quantity of TBs of the one multi-TB alternate transmission in response to determining that the user equipment is in the FD-FDD mode and it is not configured that the plurality of HARQ feedbacks are bound to the same PUCCH resource to be transmitted.

The indication information used for indicating the quantity of TBs of one multi-TB alternate transmission may be preconfigured by a base station administrator and the like or issued by a core network.

In response to determining that the user equipment is in the HD-FDD mode, the user equipment does not support bundling of the plurality of HARQ feedbacks to the same PUCCH resource for transmission, so the quantity of TBs of one multi-TB alternate transmission may be determined according to the indication information, or the total quantity of TBs scheduled by the base station is determined to be the quantity of TBs of one multi-TB alternate transmission.

In an example, the method further includes:

downlink control information (DCI) of the multi-TB alternate transmission is issued, where the DCI includes:

the HARQ bundling configuration and the total quantity of the to-be-transmitted TBs, where the HARQ bundling configuration includes:

the quantity of the HARQ feedbacks bound to the same PUCCH resource to be transmitted.

The base station may firstly determine the total quantity of to-be-transmitted TBs and determine the HARQ bundling configuration, that is, the quantity of the HARQ feedbacks bound to the same PUCCH resource to be transmitted. The quantity of the HARQ feedbacks bound to the same PUCCH resource to be transmitted may be set by the base station according to the total quantity of TBs needing to be sent, actual demands of a communication link, etc. The total quantity of to-be-transmitted TBs may be the total quantity of TBs needing to be transmitted by using a multi-TB alternate transmission mechanism.

For example, the quantity of the HARQ feedbacks bound to the same PUCCH resource to be transmitted may be set to be smaller than or equal to the total quantity of TBs. The base station may set the total quantity of TBs to be integer multiples of the quantity of the HARQ feedbacks transmitted on the same PUCCH resource.

The base station can send the total quantity of TBs and the HARQ bundling configuration to the user equipment through the DCI. The user equipment may determine the quantity of TBs needing to be received according to the total quantity of TBs, and determine an HARQ bundling mode and configuration of multi-TB alternate transmission adopted for received TBs according to the HARQ bundling configuration so as to complete receiving of the TBs and transmission of the HARQ feedbacks. Accordingly, reliability of TB transmission and accuracy of the HARQ feedbacks can be improved, and transmission efficiency is improved.

The user equipment can determine the quantity of TBs in one multi-TB alternate transmission according to the size, that is, the quantity of the HARQ feedbacks bound to the same PUCCH resource to be transmitted.

The user equipment, after receiving the DCI, determines the quantity of the HARQ feedbacks carried in the DCI and bound to the same PUCCH resource to be transmitted to be the quantity of TBs of one multi-TB alternate transmission during receiving of the TBs sent by using the multi-TB alternate transmission, and receives the TBs sent by the base station by using the multi-TB alternate transmission according to the quantity of TBs of one multi-TB alternate transmission. The number of re-transmissions of each TB in the multi-TB alternate transmission unit, the total number of re-transmissions of each TB and the like may be preset by the base station and the user equipment.

In an example, the DCI further includes: identification information of a TB corresponding to an HARQ-ACK bound to the same PUCCH resource to be transmitted.

The TB identification information may be an added serial number and the like in each TB, and the serial number may be a scheduling sequence number of the TB and used for only identifying its corresponding TB. A distinguishing mark may be made for the TB identification information bound to the same PUCCH resource in the DCI, for example, TB identification information of TBs bound to the same PUCCH resource to be fed back may be fixed together so as to indicate the user equipment that TBs corresponding to the TB identification information fixed together are TBs bound to the HARQ feedbacks. Accordingly, designation of the TBs bound to the HARQ feedbacks may be realized by the base station. The user equipment can bind the HARQ feedbacks of designated TBs to the PUCCH resource and send the feedbacks.

In an example, using the multi-TB alternate transmission to send the TB on the basis of the configuration information includes:

different TBs are sent by using one or repeated multi-TB alternate transmissions on the basis of the quantity of TBs of the one multi-TB alternate transmission and the total quantity of TBs till the quantity of sent TBs reaches the total quantity of TBs.

The base station may determine the quantity of the HARQ feedbacks bound to the same PUCCH resource to be transmitted to be the quantity of TBs of one multi-TB alternate transmission. All TBs scheduled by the base station are sent to the user equipment.

The quantity of TBs scheduled by the base station is usually larger than or equal to the quantity of TBs of one multi-TB alternate transmission, so the TBs scheduled by the base station may be sent by using one or repeated multi-TB alternate transmissions till all the TBs are sent.

The user equipment, after finishing receiving the TBs of one multi-TB alternate transmission, determines a receiving condition of the TBs of the one multi-TB alternate transmission and sends an HARQ feedback. It is not needed to send the HARQ feedback after finishing receiving all the TBs scheduled by the base station. The HARQ feedbacks of TBs of the same multi-TB alternate transmission are transmitted by using the same PUCCH resource.

The base station receives the HARQ feedbacks of the TBs of one multi-TB alternate transmission by using the PUCCH resource, and determines the receiving condition of the TBs of the one multi-TB alternate transmission according to the HARQ feedbacks. If an HARQ feedback indicates receiving failure of a TB, the TB not received successfully is re-transmitted.

The base station divides the scheduled TBs to be sent by repeated multi-TB alternate transmissions, and a time domain resource occupied by each multi-TB alternate transmission is different for each multi-TB alternative transmission. The user equipment, after receiving the TBs sent by each multi-TB alternate transmission, binds the HARQ feedbacks of the TBs sent by the current multi-TB alternate transmission and sends the bound HARQ feedbacks in one PUCCH resource. Here, the bound HARQ feedbacks may be sent in fixed time after receiving the TBs sent by one multi-TB alternate transmission.

Time points of finishing receiving the TBs sent by each multi-TB alternate transmission by the user equipment have a time interval of one multi-TB alternate transmission in a time domain, so sending time points of the HARQ feedbacks of the TBs sent by each multi-TB alternate transmission also have a corresponding time interval, this time interval is usually longer than a time domain resource occupied by one PUCCH resource of sending the bound HARQ feedbacks.

Figure 7:
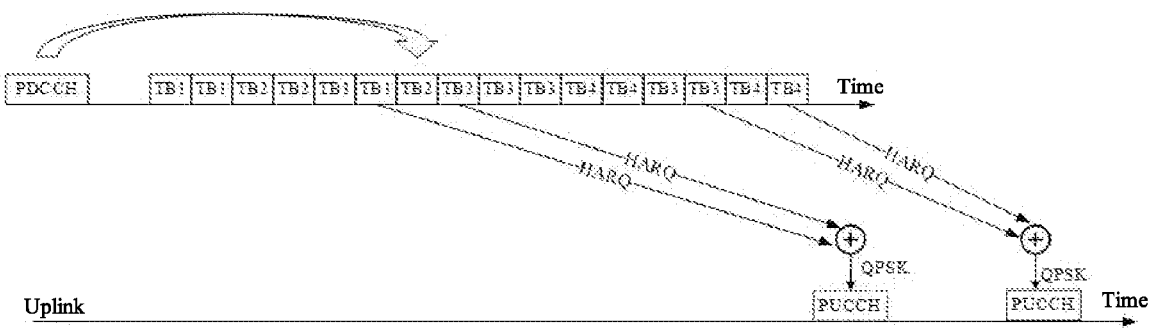
FIG. 7 is a schematic diagram of multi-TB alternate transmission of TBs shown according to an example of the present disclosure.

For example, as shown in FIG. 7, TB1 and TB 2 are TBs sent by using the first multi-TB alternate transmission, and TB3 and TB4 are TBs sent by using the second multi-TB alternate transmission. After the user equipment receives TB1 and TB2, on the one hand, the user equipment continues receiving TB3 and TB4, on the other hand, the user equipment sends HARQ feedbacks bound by TB1 and TB2 to the base station. The user equipment, after receiving TB3 and TB4, sends HARQ feedbacks bound by TB3 and TB4 to the base station. Time from receiving the TB to sending the HARQ feedback by the user equipment is relatively fixed, so sending time of the HARQ feedbacks bound by TB1 and TB2 and sending time of the HARQ feedbacks bound by TB3 and TB4 have a time interval of one multi-TB alternate transmission, and thus the HARQ feedbacks of two multi-TB alternate transmissions also have a time interval of one multi-TB alternate transmission. Thus interleaving of transmission resources of the HARQ feedbacks of two multi-TB alternate transmissions in a time domain is reduced.

In this way, on the one hand, the user equipment feeds back the receiving condition of the already received TBs in time, speed of sending the HARQ feedbacks after receiving the TBs by the user equipment is improved, and feedback time delay is shortened. On the other hand, the HARQ feedbacks are sent by using a time interval between the two multi-TB alternate transmissions, probability of interleaving of the bound HARQ feedbacks of the TBs in two multi-TB alternate transmissions before and after in time domain can be reduced, and a transmission success rate of the HARQ feedbacks is increased.

In an example, the method further includes:

N re-transmissions of I different TBs are determined to be a TB alternate transmission unit; and sending the different TBs by using the one multi-TB alternate transmission includes:

transmission of the TB alternate transmission unit is continued in response to determining that N is smaller than the total number M of re-transmissions configured for each TB till the number of transmissions of each TB is equal to M, where M and N are positive integers larger than 0, and I is the quantity of TBs of the one multi-TB alternate transmission.

The multi-TB alternate transmission unit includes: the different TBs sent by one multi-TB alternate transmission. The TBs are ranked in a certain predetermined sequence, for example, in a scheduling sequence of the base station, to form the multi-TB alternate transmission unit. Each of the different TBs is re-transmitted for N times in the multi-TB alternate transmission unit, the multi-TB alternate transmission unit is re-transmitted for many times till the number of the re-transmissions of each TB reaches the predetermined total number M of the re-transmissions.

As shown in FIG. 7, the quantity of TBs of one multi-TB alternate transmission is 2, and TB1 and TB2 are TBs of one multi-TB alternate transmission. The total number M of re-transmissions of one TB is preset to be 4. The TB1 and TB2 constitute one multi-TB alternate transmission unit, and TB1 and TB2 in the multi-TB alternate transmission unit is re-transmitted for N times, where N is 2. The multi-TB alternate transmission unit is re-transmitted for two times, so the total number of re-transmissions of TB1 and TB2 is 4. Data contents contained in TB1 and TB2 are different. Contents of TB1 transmitted for four times are the same. Accumulation of receiving power of the same TB can be realized through the multi-TB alternate transmission, so that a decoding success rate of a receiving end of the TB is increased.

In an example, sending the different TBs by using the repeated TB alternate transmissions till the quantity of sent TBs reaches the total quantity of TB includes:

the different TBs are sent by using the repeated multi-TB alternate transmissions in a scheduling sequence of the different TBs till the quantity of sent TBs reaches the total quantity of TBs, where J different TBs are sent in each multi-TB alternate transmission, and J is the quantity of TBs of the one multi-TB alternate transmission.

Here, if the quantity of TBs scheduled by the base station is larger than the quantity of TBs sent by one multi-TB alternate transmission, all the TBs may be sent through repeated TB alternate transmissions in a sequence of scheduling the TBs by the base station.

For example, the user equipment, after receiving DCI, determines the total quantity of TBs to be sent by the base station to be 4, and the size of the HARQ bundling to be 2. The user equipment firstly determines to send two TBs in one multi-TB alternate transmission, finishes receiving the two TBs sent by the one multi-TB alternate transmission and then receives two other TBs sent by next multi-TB alternate transmission.

As shown in FIG. 7, four TBs need to be sent by the base station, the quantity of TBs of one multi-TB alternate transmission is 2, and TBs are scheduled by the base station in a sequence of TB1, TB2, TB3 and TB4. The total quantity of to-be-transmitted TBs indicated in the DCI is 4, and the size of the HARQ bundling is 2. While sending the TBs, the base station firstly sends the TB1 and TB2 to the user equipment by using one multi-TB alternate transmission. After finishing sending TB1 and TB2, the rest of TBs bound to the HARQ feedbacks, namely TB3 and TB4, are sent by using one multi-TB alternate transmission, and thus sending of all the scheduled TBs is completed.

The user equipment may feed back the plurality of HARQ feedbacks of the TBs of one multi-TB alternate transmission through the same PUCCH, or may precode the plurality of HARQs, such as logics and processing, and thus HARQ feedback information reflecting whole demodulating condition of the plurality of TBs is obtained. Taking FIG. 7 for example, the HARQ feedback may use "0" to represent demodulating failure, and "1" to represent demodulating success. For example, in one multi-TB alternate transmission, the HARQ feedbacks "1" of TB1 and TB2 indicates demodulating success, all the HARQ feedbacks are subject to bitwise logic and operation to obtain HARQ feedback information "1", which indicates demodulating success of both TB1 and TB2. If there is an HARQ feedback "0" of the TB1 and TB2, all the HARQ feedbacks are subject to bitwise logic and operation to obtain HARQ feedback information "0", which indicates demodulating failure of at least one of TB1 and TB2. A precoding mode of the HARQ feedbacks of TB3 and TB4 is the same as the precoding mode of TB1 and TB2, which is not described in detail here.

Feedback information generated after precoding may be adjusted by using BPSK or QPSK and sent to the base station, and the base station may decode the HARQ feedback information by using a demodulating mode of BPSK or QPSK.

Figure 8:
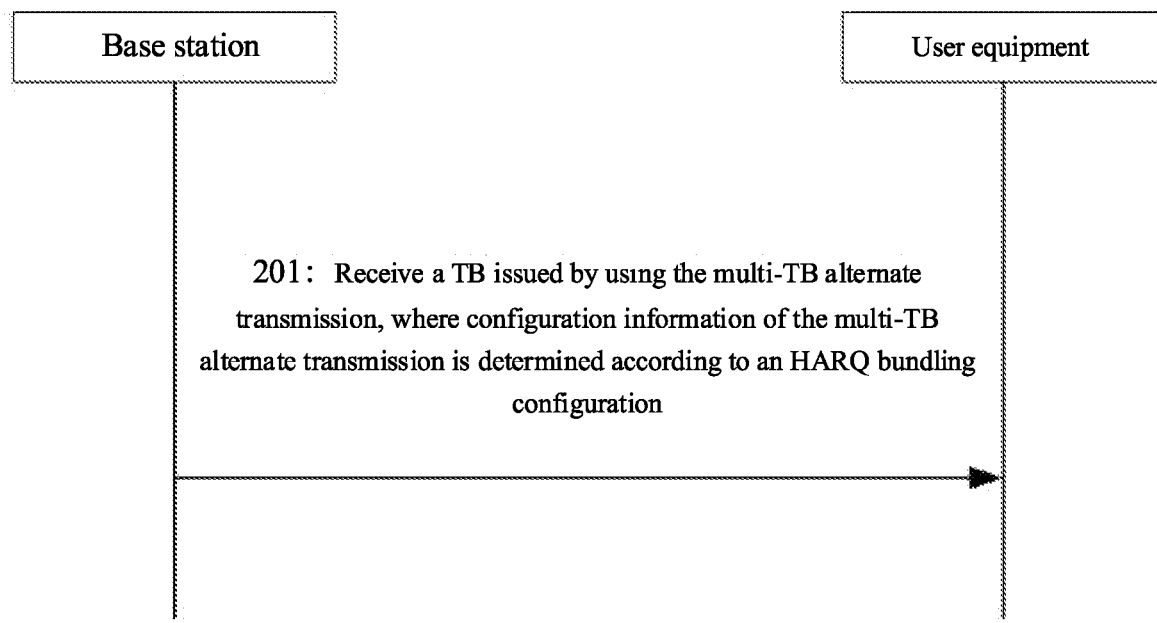
FIG. 8 is a schematic flowchart of another data transmission method shown according to an example of the present disclosure.

As shown in FIG. 8, an example provides a data transmission method. The data transmission method may be applied to user equipment of wireless communication and includes:

Step 201: a TB issued by using the multi-TB alternate transmission is received, configuration information of the multi-TB alternate transmission is determined according to an HARQ bundling configuration.

HARQ bundling means that HARQ feedbacks of a plurality of TBs are bound to one PUCCH resource to be transmitted. The HARQ bundling configuration may include: the quantity of the HARQ feedbacks bound to the PUCCH resource to be transmitted, etc.; or may include: configuring whether the HARQ feedbacks of the plurality of TBs are bound to the PUCCH resource to be transmitted. PUCCH may be MPUCCH in MTC.

The configuration information of the multi-TB alternate transmission includes: the quantity of the TBs of one multi-TB alternate transmission, the number of re-transmissions of each TB in one multi-TH alternate transmission unit, the total number of re-transmissions of each TB, etc. In the multi-TB alternate transmission, the predetermined quantity of TBs may be set in the one multi-TB alternate transmission unit to be transmitted, each TB may be re-transmitted for many times in the one multi-TB alternate transmission unit, and the multi-TB alternate transmission unit is also transmitted for many times. So the total number of re-transmissions of each TB reaches the predetermined number.

Here, different configuration information of TB alternate transmission may be determined specific to different HARQ bundling configurations, or when the HARQ bundling configuration indicates not to perform HARQ bundling, corresponding configuration information of TB alternate transmission may be set.

HARQ bundling means that HARQ feedbacks of a plurality of TBs are bound to one PUCCH resource to be transmitted. The HARQ bundling configuration may include: the quantity of the HARQ feedbacks bound to the PUCCH resource to be transmitted, etc.; or may include: configurating whether the HARQ feedbacks of the plurality of TBs are bound to the PUCCH resource to be transmitted. PUCCH may be MPUCCH in MTC.

The configuration information of the multi-TB alternate transmission includes: the quantity of TBs of one multi-TB alternate transmission, the number of re-transmissions of each TB in one multi-TB alternate transmission unit, the total number of re-transmissions of each TB, etc. In the multi-TB alternate transmission, the predetermined quantity of TBs may be set in one multi-TB alternate transmission unit to be transmitted, each TB may be re-transmitted for many times in the multi-TB alternate transmission unit, and the multi-TB alternate transmission unit is also transmitted for many times. So the total number of re-transmissions of each TB reaches the predetermined number.

Here, different configuration information of TB alternate transmission may be determined specific to different HARQ bundling configurations, or when the HARQ bundling configuration indicates not to perform HARQ bundling, corresponding configuration information of TB alternate transmission may be set.

For example, when the HARQ bundling configuration indicates not to bind the HARQ feedbacks of the plurality of TBs to the PUCCH resource to be transmitted, the total number of to-be-transmitted TBs may be determined to be the quantity of TBs of one multi-TB alternate transmission.

Accordingly, the configuration information of the multi-TB alternate transmission is determined according to the HARQ bundling configuration, the configured multi-TB alternate transmission can be adapted to a current HARQ bundling configuration, the probability of data transmission failure caused by no match between the multi-TB alternate transmission and the HARQ bundling configuration of the user equipment is reduced, and thus transmission efficiency is improved.

A base station, before determining the configuration of the multi-TB alternate transmission, may also determine a duplex mode of the user equipment, and determine the configuration information of the multi-TB alternate transmission according to the duplex mode of the user equipment and/or the HARQ bundling configuration.

Here, the duplex mode includes FD-FDD and HD-FDD. The user equipment can transmit data at the same time by using different frequency domains in an uplink and a downlink in a full duplex frequency-division duplex mode. The Half Duplex Frequency-Division Duplex can perform data transmission in the uplink or the downlink at the same time. The base station may determine a working mode of the user equipment according to report information of the user equipment.

For example, if the user equipment is in the FD-FDD mode, the uplink and the downlink can transmit data at the same time, the multi-TB alternate transmission and transmission of the HARQ feedback of the TB whose transmission is completed may be performed in the uplink and the downlink respectively, so multi-TB alternate transmission configuration suitable for performing the multi-TB alternate transmission and HARQ feedback transmission at the same time can be adopted.

Accordingly, the configuration information of the multi-TB alternate transmission is determined according to the HARQ bundling configuration, the configured multi-TB alternate transmission can be adapted to a current communication mode, the probability of data transmission failure caused by no match between the multi-TB alternate transmission and the working mode in which the user equipment is located is reduced, and thus transmission efficiency is improved.

The quantity of TBs of one multi-TB alternate transmission is determined by the base station according to a size of HARQ feedbacks bound to the same PUCCH resource in response to determining that the user equipment is in a Full Duplex Frequency Division Duplex (FD-FDD) mode and the HARQ bundling configuration indicates that the plurality of HARQ feedbacks are bound to the same Physical Uplink Control Channel (PUCCH) resource to be transmitted.

Here, the quantity of TBs of one multi-TB alternate transmission may be determined by an MTC supporting base station according to the size of the HARQ bundling. The size of the HARQ bundling may be determined to be the quantity of TBs of one multi-TB alternate transmission. The quantity of TBs of one multi-TB alternate transmission is the quantity of different TBs contained in the one multi-TB alternate transmission. Here, TB is a content block, and data contents contained in the different TBs are different.

The size of the HARQ bundling may refer to the quantity of the plurality of HARQ feedbacks bound to the same PUCCH resource to be transmitted, and the quantity of HARQ feedbacks corresponds to the quantity of TBs.

For example, the size of the HARQ bundling is 2, it indicates that the HARQ feedbacks of two different TBs are bound to one PUCCH resource to be transmitted. Here, the quantity of TBs of one multi-TB alternate transmission may be determined to be 2.

The quantity of TBs of one multi-TB alternate transmission is determined by the base station on the basis of preconfigured indication information or the total quantity of to-be-transmitted TBs is determined by the base station to be the quantity of TBs of one multi-TB alternate transmission in response to determining that the user equipment is in a half-duplex frequency division duplex (HD-FDD) mode; or The quantity of TBs of the one multi-TB alternate transmission is determined by the base station on the basis of the preconfigured indication information or the total quantity of to-be-transmitted TBs is determined by the base station to be the quantity of TBs of the one multi-TB alternate transmission in response to determining that the user equipment is in the FD-FDD mode and it is not configured that the plurality of HARQ feedbacks are bound to the same PUCCH resource to be transmitted.

The indication information used for indicating the quantity of TBs of one multi-TB alternate transmission may be preconfigured by a base station administrator and the like or issued by a core network.

In response to determining that the user equipment is in the HD-FDD mode, the user equipment does not support bundling of the plurality of HARQ feedbacks to the same PUCCH resource for transmission, so the quantity of TBs of one multi-TB alternate transmission may be determined according to the indication information, or the total quantity of TBs scheduled by the base station is determined to be the quantity of TBs of one multi-TB alternate transmission.

In an example, the method further includes:

downlink control information (DCI) of the multi-TB alternate transmission sent by the base station is received; and the quantity of TBs of one multi-TB alternate transmission is determined according to the quantity of the plurality of HARQ feedbacks contained in the DCI bound to the same PUCCH resource to be transmitted.

The base station may firstly determine the total quantity of to-be-transmitted TBs and determine the HARQ bundling configuration, that is, the quantity of the HARQ feedbacks bound to the same PUCCH resource to be transmitted. The quantity of the HARQ feedbacks bound to the same PUCCH resource to be transmitted may be set by the base station according to the total quantity of TBs needing to be sent, actual demands of a communication link, etc. The total quantity of to-be-transmitted TBs may be the total quantity of TBs needing to be transmitted by using a multi-TB alternate transmission mechanism.

For example, the quantity of the HARQ feedbacks bound to the same PUCCH resource to be transmitted may be set to be smaller than or equal to the total quantity of TBs. The base station may set the total quantity of TBs to be integer multiples of the quantity of the HARQ feedbacks transmitted on the same PUCCH resource.

The base station sends the total quantity of TBs and the HARQ bundling configuration to the user equipment through the DCI. The user equipment may determine the quantity of TBs needing to be received according to the total quantity of TBs, and determine an HARQ bundling mode and configuration of multi-TB alternate transmission adopted for received TBs according to the HARQ bundling configuration so as to complete receiving of the TBs and transmission of the HARQ feedbacks. Accordingly, reliability of TB transmission and accuracy of the HARQ feedbacks can be improved, and transmission efficiency is improved.

The user equipment can determine the quantity of TBs in one multi-TB alternate transmission according to the size, that is, the quantity of the HARQ feedbacks bound to the same PUCCH resource to be transmitted.

The user equipment, after receiving the DCI, determines the quantity of the HARQ feedbacks carried in the DCI and bound to the same PUCCH resource to be transmitted to be the quantity of TBs of one multi-TB alternate transmission during receiving of the TBs sent by using the multi-TB alternate transmission, and receives the TBs sent by the base station by using the multi-TB alternate transmission according to the quantity of TBs of one multi-TB alternate transmission. The number of re-transmissions of each TB in the multi-TB alternate transmission unit, the total number of re-transmissions of each TB and the like may be preset by the base station and the user equipment.

In an example, the DCI further includes: identification information of a TB corresponding to an HARQ-ACK bound to the same PUCCH resource to be transmitted.

The TB identification information may be an added serial number and the like in each TB, and the serial number may be a scheduling sequence number of the TB and used for only identifying its corresponding TB. A distinguishing mark may be made for the TB identification information bound to the same PUCCH resource in the DCI, for example, TB identification information of TBs bound to the same PUCCH resource to be fed back may be fixed together so as to indicate the user equipment that TBs corresponding to the TB identification information fixed together are TBs bound to the HARQ feedbacks. Accordingly, designation of the TBs bound to the HARQ feedbacks may be realized by the base station. The user equipment can bind the HARQ feedbacks of designated TBs to the PUCCH resource and send the feedbacks.

The DCI further includes: identification information of a TB corresponding to an HARQ-ACK bound to the same PUCCH resource to be transmitted.

The TB identification information may be an added serial number of an initially transmitted transmission block, etc., and the serial number is used for only identifying its corresponding TB. A distinguishing mark may be made for the TB identification information bound to the same PUCCH in the DCI, for example, TB identification information of TBs bound to the same PUCCH to be fed back may be fixed together so as to indicate the user equipment that TBs corresponding to the TB identification information fixed together are TBs bound to the HARQ feedbacks.

In an example, receiving the TB issued by using the multi-TB alternate transmission includes:

different TBs issued by using one or repeated TB alternate transmissions are received on the basis of the quantity of TBs of the one multi-TB alternate transmission and the total quantity of to-be-transmitted TBs contained in the DCI till the quantity of received TBs reaches the total quantity of TBs.

The base station may determine the quantity of the HARQ feedbacks bound to the same PUCCH resource to be transmitted to be the quantity of TBs of one multi-TB alternate transmission. All TBs scheduled by the base station are sent to the user equipment.

The quantity of TBs scheduled by the base station is usually larger than or equal to the quantity of TBs of one multi-TB alternate transmission, so the TBs scheduled by the base station may be sent by using one or repeated multi-TB alternate transmissions till all the TBs are sent.

The user equipment, after finishing receiving the TBs of one multi-TB alternate transmission, determines a receiving condition of the TBs of the one multi-TB alternate transmission and sends an HARQ feedback. It is not needed to send the HARQ feedback after finishing receiving all the TBs scheduled by the base station. The HARQ feedbacks of TBs of the same multi-TB alternate transmission are transmitted by using the same PUCCH resource.

The base station receives the HARQ feedbacks of the TBs of one multi-TB alternate transmission by using the PUCCH resource, and determines the receiving condition of the TBs of the one multi-TB alternate transmission according to the HARQ feedbacks. If an HARQ feedback indicates receiving failure of a TB, the TB not received successfully is re-transmitted.

The base station divides the scheduled TBs to be sent by repeated multi-TB alternate transmissions, and a time domain resource occupied by each multi-TB alternate transmission is different. The user equipment, after receiving the TBs sent by each multi-TB alternate transmission, binds the HARQ feedbacks of the TBs sent by the current multi-TB alternate transmission and sends the bound HARQ feedbacks in one PUCCH resource. Here, the bound HARQ feedbacks may be sent in fixed time after receiving the TBs sent by one multi-TB alternate transmission.

Time points of finishing receiving the TBs sent by each multi-TB alternate transmission by the user equipment have a time interval of one multi-TB alternate transmission in a time domain, so sending time points of the HARQ feedbacks of the TBs sent by each multi-TB alternate transmission also have a corresponding time interval, this time interval is usually longer than a time domain resource occupied by one PUCCH resource of sending the bound HARQ feedbacks.

For example, as shown in FIG. 7, TB1 and TB 2 are TBs sent by using the first multi-TB alternate transmission, and TB3 and TB4 are TBs sent by using the second multi-TB alternate transmission. After the user equipment receives TB1 and TB2, on the one hand, the user equipment continues receiving TB3 and TB4, on the other hand, the user equipment sends HARQ feedbacks bound by TB1 and TB2 to the base station. The user equipment, after receiving TB3 and TB4, sends HARQ feedbacks bound by TB3 and TB4 to the base station. Time from receiving the TB to sending the HARQ feedback by the user equipment is relatively fixed, so sending time of the HARQ feedbacks bound by TB1 and TB2 and sending time of the HARQ feedbacks bound by TB3 and TB4 have a time interval of one multi-TB alternate transmission, and thus the HARQ feedbacks of two multi-TB alternate transmissions also have a time interval of one multi-TB alternate transmission. Thus interleaving of transmission resources of the HARQ feedbacks of two multi-TB alternate transmissions in a time domain is reduced.

In this way, on the one hand, the user equipment feeds back the receiving condition of the already received TBs in time, speed of sending the HARQ feedbacks after receiving the TBs by the user equipment is improved, and feedback time delay is shortened. On the other hand, the HARQ feedbacks are sent by using a time interval between the two multi-TB alternate transmissions, probability of interleaving of the bound HARQ feedbacks of the TBs in two multi-TB alternate transmissions before and after in time domain can be reduced, and a transmission success rate of the HARQ feedbacks is increased.

In an example, receiving the different TBs issued by using the repeated TB alternate transmissions till the quantity of the received TBs reaches the total quantity of TBs includes:

the different TBs sent by using the repeated multi-TB alternate transmissions in a scheduling sequence of the different TBs are received till the quantity of received TBs reaches the total quantity of TBs, J different TBs are sent in each multi-TB alternate transmission, and J is the quantity of TBs of the one multi-TB alternate transmission.

The multi-TB alternate transmission unit includes: the different TBs sent by one multi-TB alternate transmission. The TBs are ranked in a certain predetermined sequence, for example, in a scheduling sequence of the base station, to form the multi-TB alternate transmission unit. Each of the different TBs is re-transmitted for N times in the multi-TB alternate transmission unit, the multi-TB alternate transmission unit is re-transmitted for many times till the number of the re-transmissions of each TB reaches the predetermined total number M of the re-transmissions.

As shown in FIG. 7, the quantity of TBs of one multi-TB alternate transmission is 2, and TB1 and TB2 are TBs of one multi-TB alternate transmission. The total number M of re-transmissions of one TB is preset to be 4. The TB1 and TB2 constitute one multi-TB alternate transmission unit, and TB1 and TB2 in the multi-TB alternate transmission unit is re-transmitted for N times, where N is 2. The multi-TB alternate transmission unit is re-transmitted for two times, so the total number of re-transmissions of TB1 and TB2 is 4. Data contents contained in TB1 and TB2 are different from each other. Contents of TB1 transmitted for four times are the same. Accumulation of receiving power of the same TB can be realized through the multi-TB alternate transmission, so that a decoding success rate of a receiving end of the TB is increased.

The user equipment, after receiving DCI, determines the total quantity of TBs to be sent by the base station to be 4, and the size of the HARQ bundling to be 2. The user equipment firstly determines to send two TBs in one multi-TB alternate transmission, finishes receiving the two TBs sent by the one multi-TB alternate transmission and then receives two other TBs sent by next multi-TB alternate transmission.

Here, if the quantity of TBs scheduled by the base station is larger than the quantity of TBs sent by one multi-TB alternate transmission, all the TBs may be sent through repeated TB alternate transmissions in a sequence of scheduling the TBs by the base station.

For example, the user equipment, after receiving DCI, determines the total quantity of TBs to be sent by the base station to be 4, and the size of the HARQ bundling to be 2. The user equipment firstly determines to send two TBs in one multi-TB alternate transmission, finishes receiving the two TBs sent by the one multi-TB alternate transmission and then receives two other TBs sent by next multi-TB alternate transmission.

As shown in FIG. 7, four TBs need to be sent by the base station, the quantity of TBs of one multi-TB alternate transmission is 2, and TBs are scheduled by the base station in a sequence of TB1, TB2, TB3 and TB4. The total quantity of to-be-transmitted TBs indicated in the DCI is 4, and the size of the HARQ bundling is 2. While sending the TBs, the base station firstly sends the TB1 and TB2 to the user equipment by using one multi-TB alternate transmission. After finishing sending TB1 and TB2, the rest of TBs bound to the HARQ feedbacks, namely TB3 and TB4, are sent by using one multi-TB alternate transmission, and thus sending of all the scheduled TBs is completed.

The user equipment may feed back the plurality of HARQ feedbacks of the TBs of one multi-TB alternate transmission through the same PUCCH, or may precode the plurality of HARQs, such as logics and processing, and thus HARQ feedback information reflecting whole demodulating condition of the plurality of TBs is obtained. Taking FIG. 7 for example, the HARQ feedback may use "0" to represent demodulating failure, and "1" to represent demodulating success. For example, in one multi-TB alternate transmission, the HARQ feedbacks "1" of TB1 and TB2 indicates demodulating success, all the HARQ feedbacks are subject to bitwise logic and operation to obtain HARQ feedback information "1", which indicates demodulating success of both TB1 and TB2. If there is an HARQ feedback "0" of the TB1 and TB2, all the HARQ feedbacks are subject to bitwise logic and operation to obtain HARQ feedback information "0", which indicates demodulating failure of at least one of TB1 and TB2. A precoding mode of the HARQ feedbacks of TB3 and TB4 is the same as the precoding mode of TB1 and TB2, which is not described in detail here.

Feedback information generated after precoding may be adjusted by using BPSK or QPSK and sent to the base station, and the base station may decode the HARQ feedback information by using a demodulating mode of BPSK or QPSK.

In an example, the method further includes:

an HARQ feedback of the received TB is sent by using a kth predetermined subframe after receiving the TB issued by using the one multi-TB alternate transmission.

Here, the HARQ feedback of the TB issued by using the one multi-TB alternate transmission may be sent to the base station in an HARQ bundling mode.

Processing such as decoding needs to be performed after receiving the TB issued by the one multi-TB alternate transmission, and the receiving condition of the TB is determined. The HARQ feedback is sent through the Kth predetermined subframe after receiving the TB, so needed processing time can be provided for the user equipment, and thus the probability of an error of the HARQ feedback is reduced.

A mode of the multi-TB alternate transmission mainly needs to determine two parameters, one of which is how many TBs are alternately generated, and the other one of which is how many times of re-transmissions are contained in the one multi-TB alternate transmission unit. The example mainly involves determining of the first parameter. Here, hypothetically, the number of re-transmissions contained in the one multi-TB alternate transmission unit is X.

First case: whether the user equipment is FD-FDD UE or HD-FDD UE may be determined firstly. As for the HD-FDD UE, the quantity of TBs of the multi-TB alternate transmission may be configured through high-layer signaling, or all the scheduled TBs are subjected to the multi-TB alternate transmission.

Second case: if the user equipment is FD-FDD UE, whether HARQ feedback bundling supporting is configured for a user is further judged. If no HARQ bundling is configured, the quantity of TBs subjected to multi-TB alternate transmission may be configured through high-layer signaling, or all the scheduled TBs are subjected to multi-TB alternate transmission.

Figure 9:
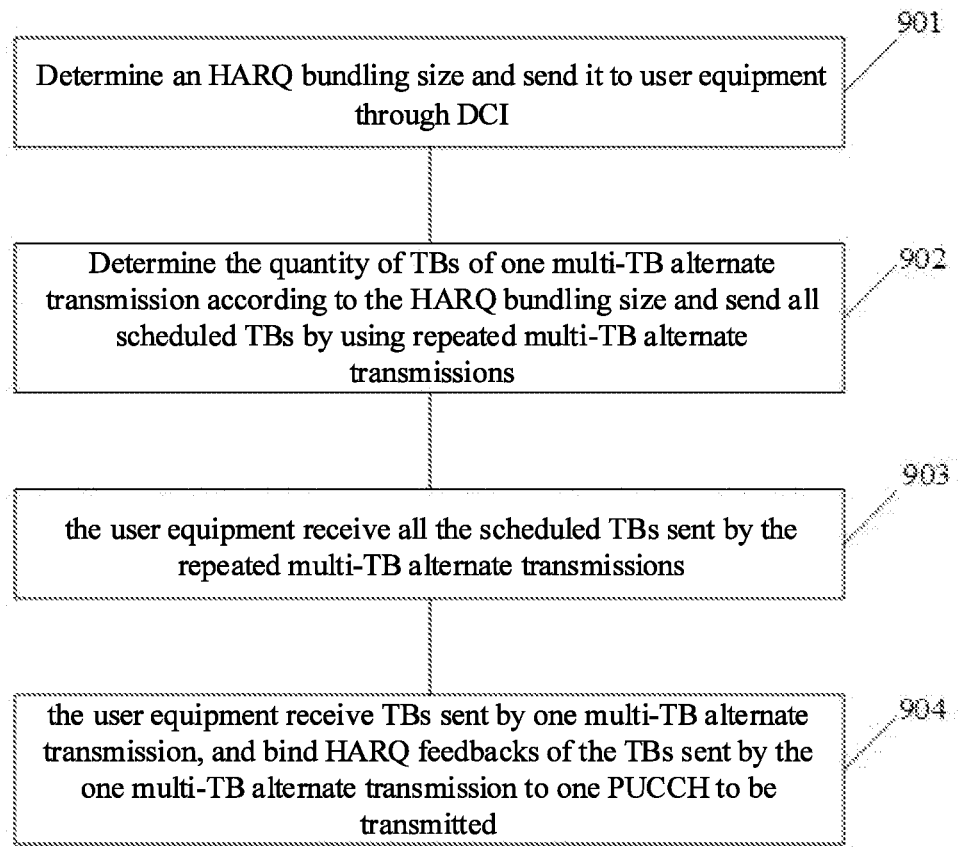
FIG. 9 is a schematic flowchart of yet another data transmission method shown according to an example of the present disclosure.

Third case: if the user equipment is FD-FDD UE and provided with HARQ bundling, determining is made in the following mode:

the user equipment may determine that HARQ feedbacks of which of TBs need to be bound to the same PUCCH to be transmitted according to indication of the DCI, and then determine that which of TBs are subjected to multi-TB alternate transmission. As shown in FIG. 9, specific steps are as follows.

Step 901: the base station determines a size of HARQ bundling by the user and that HARQs of which of TBs will be bound to the same PUCCH to be transmitted, and the information is packaged in the DCI to be transmitted to the user.

Step 902: the base station performs multi-TB alternate transmission on a PDSCH according to HARQ bundling size and a mapping relation between TBs and the HARQ feedbacks. For example, as shown in FIG. 7, the base station schedules a total of four TBs, the HARQ feedbacks of TB1 and TB2 will be bound to the same PUCCH to be transmitted, and HARQ feedbacks of TB3 and TB4 will be bound to the same PUCCH to be transmitted. The base station can finish multi-TB alternate transmission of TB1 and TB2, and then perform multi-TB alternate transmission on TB3 and TB4.

Step 903: the user equipment, after receiving the DCI, determines a receiving solution of subsequent TBs according to information of the HARQ bundling. The user equipment, through the DCI, discovers that the HARQ feedbacks of TB1 and TB2 will be bound to the same PUCCH to be transmitted, and the HARQ feedbacks of TB3 and TB4 will be bound to the same PUCCH to be transmitted. The user equipment may receive TB1 and TB2 alternately. After receiving of TB1 and TB2 is completed, TB3 and TB4 are received in multi-TB alternate transmission.

Step 904: when the user equipment finishes receiving of all the TBs corresponding to one HARQ bundling, the user equipment makes a feedback according to a receiving result. For example, when the user equipment finishes receiving of TB1 and TB2, a binding is performed on HARQs feedback of TB1 and TB2 through k subframes after finishing receiving of TB2.

Figure 10:
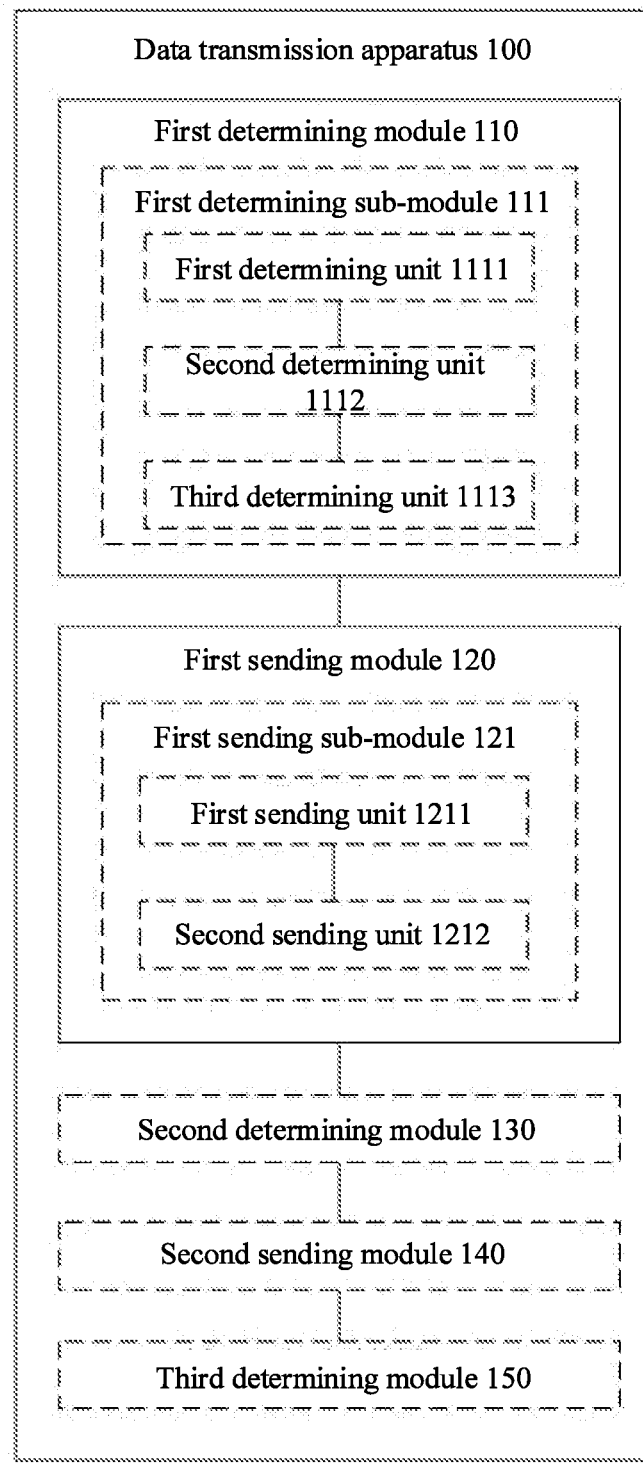
FIG. 10 is a block diagram of a composition structure of a data transmission apparatus shown according to an example of the present disclosure.

An example of the present disclosure further provides a data transmission apparatus applied to a base station of wireless communication. FIG. 10 is a schematic diagram of a composition structure of a data transmission apparatus 100 provided by an example of the present disclosure. As shown in FIG. 10, the apparatus 100 includes: a first determining module 110 and a first sending module 120.

The first determining module 110 is configured to determine configuration information of multi-TB alternate transmission according to an HARQ bundling configuration; and the first sending module 120 is configured to send a TB by using the multi-TB alternate transmission on the basis of the configuration information.

In an example, the apparatus 100 further includes:

a second determining module 130, configured to determine a duplex mode of user equipment before determining the configuration information of the multi-TB alternate transmission; and the first determining module 110 includes:

a first determining sub-module 111, configured to determine the configuration information of the multi-TB alternate transmission according to the duplex mode of the user equipment and/or the HARQ bundling configuration.

In an example, the first determining sub-module 111 includes:

a first determining unit 1111, configured to determine the quantity of TBs of one multi-TB alternate transmission according to a size of HARQ feedbacks bound to the same PUCCH resource in response to determining that the user equipment is in a full duplex frequency division duplex (FD-FDD) mode and the HARQ bundling configuration indicates that the plurality of HARQ feedbacks are bound to the same physical uplink control channel (PUCCH) resource to be transmitted.

In an example, the first determining sub-module 111 includes at least one of the following:

a second determining unit 1112, configured to determine the quantity of TBs of one multi-TB alternate transmission on the basis of preconfigured indication information or determine the total quantity of to-be-transmitted TBs to be the quantity of TBs of one multi-TB alternate transmission in response to determining that the user equipment is in a half-duplex frequency division duplex (HD-FDD) mode; or a third determining unit 1113, configured to determine the quantity of TBs of the one multi-TB alternate transmission on the basis of the preconfigured indication information or determine the total quantity of to-be-transmitted TBs to be the quantity of TBs of the one multi-TB alternate transmission in response to determining that the user equipment is in the FD-FDD mode and it is not configured that the plurality of HARQ feedbacks are bound to the same PUCCH resource to be transmitted.

In an example, the apparatus 100 further includes:

a second sending module 140, configured to issue downlink control information (DCI) of multi-TB alternate transmission, where the DCI includes:

the HARQ bundling configuration and the total quantity of to-be-transmitted TBs, where the HARQ bundling configuration includes:

the quantity of HARQ feedbacks bound to the same PUCCH resource to be transmitted.

In an example, the DCI further includes: identification information of a TB corresponding to an HARQ-ACK bound to the same PUCCH resource to be transmitted.

In an example, the first sending module 120 includes:

a first sending sub-module 121, configured to send different TBs by using one or repeated multi-TB alternate transmissions on the basis of the quantity of TBs of the one multi-TB alternate transmission and the total quantity of TBs till the quantity of sent TBs reaches the total quantity of TBs.

In an example, the apparatus 100 further includes:

a third determining module 150, configured to determine N re-transmissions of I different TBs to be a TB alternate transmission unit; and the first sending sub-module 121 includes:

a first sending unit 1211, configured to continue transmission of the TB alternate transmission unit in response to determining that N is smaller than the total number M of re-transmissions configured for each TB till the number of transmissions of each TB is equal to M, where M and N are positive integers larger than 0, and I is the quantity of TBs of the one multi-TB alternate transmission.

In an example, the first sending sub-module 121 includes:

a second sending unit 1212, configured to send the different TBs by using the repeated multi-TB alternate transmissions in a scheduling sequence of the different TBs till the quantity of sent TBs reaches the total quantity of TBs, where J different TBs are sent in each multi-TB alternate transmission, and J is the quantity of TBs of the one multi-TB alternate transmission.

Figure 11:
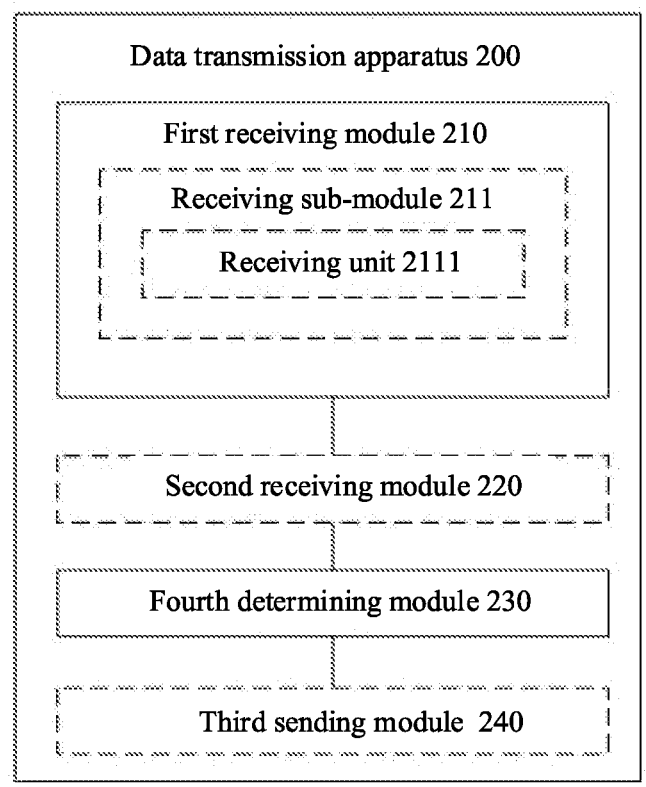
FIG. 11 is a block diagram of a composition structure of another data transmission apparatus shown according to an example of the present disclosure.

An example of the present disclosure further provides a data transmission apparatus applied to user equipment of wireless communication. FIG. 11 is a schematic diagram of a composition structure of a data transmission apparatus 200 provided by an example of the present disclosure. The apparatus 200 includes: a first receiving module 210.

the first receiving module 210 is configured to receive a TB issued by using the multi-TB alternate transmission, where configuration information of the multi-TB alternate transmission is determined according to an HARQ bundling configuration.

In an example, the apparatus 200 further includes:

a second receiving module 220, configured to receive downlink control information (DCI) of the multi-TB alternate transmission sent by a base station; and a fourth determining module 230, configured to determine the quantity of TBs of one multi-TB alternate transmission according to the quantity of a plurality of HARQ feedbacks contained in the DCI bound to the same PUCCH resource to be transmitted.

In an example, the first receiving module 210 includes:

a receiving sub-module 211, configured to receive different TBs issued by using one or repeated TB alternate transmissions on the basis of the quantity of TBs of the one multi-TB alternate transmission and the total quantity of to-be-transmitted TBs contained in the DCI till the quantity of received TBs reaches the total quantity of TBs.

In an example, the receiving sub-module 211 includes:

a receiving unit 2111, configured to receive the different TBs sent by using the repeated multi-TB alternate transmissions in a scheduling sequence of the different TBs till the quantity of the sent TBs reaches the total quantity of TBs, where J different TBs are sent in each multi-TB alternate transmission, and J is the quantity of TBs of the one multi-TB alternate transmission.

In an example, the apparatus 200 further includes:

a third sending module 240, configured to send an HARQ feedback of the received TB by using a Kth predetermined subframe after receiving the TB issued by using the one multi-TB alternate transmission.

In an example, the first determining module 110, the first sending module 120, the second determining module 130, the second sending module 140, the third determining module 150, the first receiving module 210, the second receiving module 220, the fourth determining module 230, the third sending module 240 and the like may be realized by one or more than one Central Processing Unit (CPU), Graphics Processing Unit (GPU), Baseband Processor (BP), Application Specific Integrated Circuit (ASIC), DSP, programmable logic device (PLD), Complex Programmable Logic Device (CPLD), Field-Programmable Gate Array (FPGA), general-purpose processor, controller, Micro Controller Unit (MCU), Microprocessor, or other electronic elements so as to execute the above method.

Figure 12:
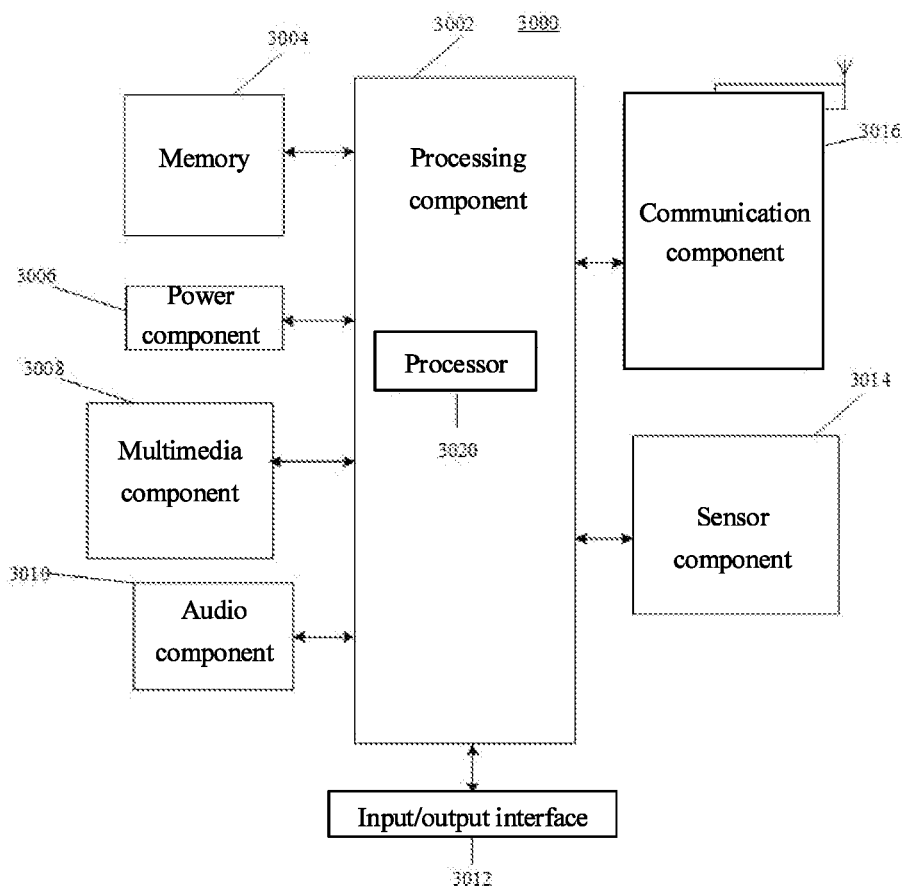
FIG. 12 is a block diagram of an apparatus for data transmission shown according to an example of the present disclosure.

FIG. 12 is a block diagram of an apparatus 3000 used for data transmission shown according to an example. For example, the apparatus 3000 may be a mobile phone, a computer, a digital broadcast terminal, a messaging device, a game console, a tablet device, a medical device, a fitness facility, a personal digital assistant, etc.

Referring to FIG. 12, the apparatus 3000 may include one or more components as follows: a processing component 3002, a memory 3004, a power component 3006, a multi-media component 3008, an audio component 3010, an input/output (I/O) interface 3012, a sensor component 3014 and a communication component 3016.

The processing component 3002 generally controls whole operation of the apparatus 3000, such as operations related to display, phone call, data communication, camera operation and recording operation. The processing component 3002 may include one or more processors 3020 for executing the instructions so as to complete all or part of steps of the above method. Besides, the processing component 3002 may include one or more modules to facilitate interaction between the processing component 3002 and the other components. For example, the processing component 3002 may include a multimedia module so as to facilitate interaction between the multimedia component 3008 and the processing component 3002.

The memory 3004 is configured to store various data so as to support operations on the apparatus 3000. Examples of these data include instructions of any application program or method for operation on the apparatus 3000, contact person data, telephone directory data, messages, pictures, videos and the like. The memory 3004 may be realized by any type of volatile or non-volatile storage device or their combination, such as a Static Random Access Memory (SRAM), an Electrically Erasable Programmable Read-only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disc.

The power component 3006 provides power for the various components of the apparatus 3000. The power component 3006 may include a power management system, one or more power sources, and other components related to power generation, management and distribution for the apparatus 3000.

The multimedia component 3008 includes a screen which provides an output interface between the apparatus 3000 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 3008 includes a front camera and/or a back camera. When the apparatus 3000 is in an operation mode, such as a photographing mode or a video mode, the front camera and/or the back camera can receive external multimedia data. Each front camera and each back camera may be a fixed optical lens system or have a focal length and an optical zoom capability.

The audio component 3010 is configured to output and/or input an audio signal. For example, the audio component 3010 includes a microphone (MIC). When the apparatus 3000 is in the operation mode, such as a call mode, a recording mode and a voice recognition mode, the microphone is configured to receive an external audio signal. The received audio signal may be further stored in the memory 3004 or sent via the communication component 3016. In some examples, the audio component 3010 further includes a speaker for outputting the audio signal.

The I/O interface 3012 provides an interface between the processing component 3002 and a peripheral interface module, and the peripheral interface module may be a keyboard, a click wheel, buttons and the like. These buttons may include but are not limited to: a home button, a volume button, a start button and a lock button.

The sensor component 3014 includes one or more sensors, configured to provide state evaluation of various aspects for the apparatus 3000. For example, the sensor component 3014 may detect a start/shut-down state of the apparatus 3000 and relative positioning of the components, for example, the components are a display and a keypad of the apparatus 3000. The sensor component 3014 may further detect position change of the apparatus 3000 or one component of the apparatus 3000, whether there is contact between the user and the apparatus 3000, and azimuth or speed up/speed down and temperature change of the apparatus 3000. The sensor component 3014 may include a proximity sensor, configured to detect existence of a nearby object without any physical contact. The sensor component 3014 may further include an optical sensor, such as a CMOS or CCD image sensor, for use in imaging application. In some examples, the sensor component 3014 may further include an acceleration sensor, a gyroscope sensor, a magnetic sensor, a pressure sensor or a temperature sensor.

The communication component 3016 is configured to facilitate wired or wireless communication between the apparatus 3000 and the other devices. The apparatus 3000 may be accessed to a wireless network based on a communication standard, such as Wi-Fi, 2G or 3G, or their combination. In an example, the communication component 3016 receives a broadcast signal or related broadcast information from an external broadcast management system via a broadcast channel. In an example, the communication component 3016 further includes a Near-field Communication (NFC) module so as to facilitate short-range communication. For example, the NFC module may be realized based on a Radio Frequency Identification (RFID) technology, an Infra-red Data Association (IrDA) technology, an Ultra wide Band (UWB) technology, a Bluetooth (BT) technology and other technologies.

In an example, the apparatus 3000 may be realized by one or more than one Application Specific Integrated Circuit (ASIC), Digital Signal Processor (DSP), Digital Signal Processing Device (DSPD), Programmable Logic Device (PLD), Field-Programmable Gate Array (FPGA), controller, microcontroller, microprocessor or other electronic element for executing the above method.

In an example, a non-transitory computer readable storage medium including instructions is further provided, such as the memory 3004 including the instructions. The instructions may be executed by a processor 3020 of an apparatus 3000 so as to complete the above method. For example, the non-transitory computer readable storage medium may be an ROM, a random access memory (RAM), a CD-ROM, a magnetic tape, a floppy disk, an optical data storage device and the like.

Those skilled in the art will easily figure out other implementation solutions of the examples of the present disclosure after considering the specification and practicing the disclosure disclosed herein. The present disclosure intends to cover any transformation, application or adaptive change of the examples of the present disclosure which conforms to a general principle of the examples of the present disclosure and includes common general knowledge or conventional technical means which are not disclosed by the examples of the present disclosure in the technical field. The specification and the examples are only regarded as illustrative.

It should be understood that the examples of the present disclosure are not limited to an identical structure described above and shown in the drawings, and various modifications and changes can be made without departing from its scope.

What is claimed is:

1. A data transmission method, applied to a base station and comprising:
   determining configuration information of one or more multi-transmission block (TB) alternate transmissions according to a hybrid automatic repeat request (HARQ) bundling configuration; and
   using the one or more multi-TB alternate transmissions to send one or more TBs on the basis of the configuration information;
   the method further comprises:
   determining a duplex mode of user equipment; and
   determining the configuration information of the one or more multi-TB alternate transmissions according to the HARQ bundling configuration comprises:
   determining the configuration information of the one or more multi-TB alternate transmissions according to the duplex mode of the user equipment and the HARQ bundling configuration;
   wherein determining the configuration information of the one or more multi-TB alternate transmissions according to the duplex mode of the user equipment and the HARQ bundling configuration comprises:
      determining a quantity of TBs of one multi-TB alternate transmission of the one or more multi-TB alternate transmissions according to a size of a plurality of HARQ feedbacks bound to a same physical uplink control channel (PUCCH) resource in response to determining that the user equipment is in a full duplex frequency division duplex (FD-FDD) mode and the HARQ bundling configuration indicates that the plurality of HARQ feedbacks are bound to the same PUCCH resource to be transmitted.

2. The method according to claim 1, further comprising:
   issuing downlink control information (DCI) of the one or more multi-TB alternate transmissions, wherein the DCI comprises:
   the HARQ bundling configuration and a total quantity of to-be-transmitted TBs, wherein
   the HARQ bundling configuration comprises:
   the size of the plurality of HARQ feedbacks bound to the same PUCCH resource to be transmitted.

3. The method according to claim 2, wherein
   the DCI further comprises: identification information of a TB of the one or more TBs corresponding to an HARQ-ACK bound to the same PUCCH resource to be transmitted.

4. The method according to claim 2, wherein using the one or more multi-TB alternate transmissions to send the one or more TBs on the basis of the configuration information comprises:
   sending different TBs by using one or repeated multi-TB alternate transmissions on the basis of the quantity of TBs of the one multi-TB alternate transmission of the one or more multi-TB alternate transmissions and the total quantity of the to-be-transmitted TBs till a quantity of sent TBs reaches the total quantity of the to-be-transmitted TBs.

5. The method according to claim 4, further comprising:
   determining N re-transmissions of I different TBs to be a TB alternate transmission unit; and
   sending the different TBs by using the one multi-TB alternate transmission comprises:
   continuing transmission of the TB alternate transmission unit in response to determining that N is smaller than a total number M of re-transmissions configured for each TB till N is equal to M, wherein M and N are positive integers larger than 0, and I is the quantity of TBs of the one multi-TB alternate transmission.

6. The method according to claim 4, wherein sending the different TBs by using the repeated TB alternate transmissions till the quantity of sent TBs reaches the total quantity of the to-be-transmitted TBs comprises:
   sending the different TBs by using the repeated multi-TB alternate transmissions in a scheduling sequence of the different TBs till the quantity of sent TBs reaches the total quantity of the to-be-transmitted TBs, wherein J different TBs are sent in a multi-TB alternate transmission, and J is the quantity of TBs of the one multi-TB alternate transmission.

7. A data transmission method, applied to user equipment and comprising:
   receiving one or more transmission blocks (TBs) issued by using one or more multi-TB alternate transmissions, wherein configuration information of the one or more multi-TB alternate transmissions is determined through following steps:
   determining a duplex mode of user equipment;
   determining a quantity of TBs of one multi-TB alternate transmission of the one or more multi-TB alternate transmissions according to a size of a plurality of hybrid automatic repeat request (HARQ) feedbacks bound to a same physical uplink control channel (PUCCH) resource in response to determining that the user equipment is in a full duplex frequency division duplex (FD-FDD) mode and the HARQ bundling configuration indicates that the plurality of HARQ feedbacks are bound to the same PUCCH resource to be transmitted.

8. The method according to claim 7, further comprising:
receiving downlink control information (DCI) of the one or more multi-TB alternate transmissions sent by a base station; and
determining the quantity of TBs of the one multi-TB alternate transmission of the one or more multi-TB alternate transmissions according to the size of the plurality of HARQ feedbacks contained in the DCI bound to the same PUCCH resource to be transmitted.

9. The method according to claim 8, wherein receiving the one or more TBs issued by using the one or more multi-TB alternate transmissions comprises:
receiving different TBs issued by using one or repeated TB alternate transmissions on the basis of the quantity of TBs of the one multi-TB alternate transmission and a total quantity of to-be-transmitted TBs contained in the DCI till a quantity of received TBs reaches the total quantity of the to-be-transmitted TBs.

10. The method according to claim 9, wherein receiving the different TBs issued by using the repeated TB alternate transmissions till the quantity of received TBs reaches the total quantity of the to-be-transmitted TBs comprises:
receiving the different TBs sent by using the repeated multi-TB alternate transmissions in a scheduling sequence of the different TBs till the quantity of the received TBs reaches the total quantity of the to-be-transmitted TBs, wherein J different TBs are received in a multi-TB alternate transmission, and J is the quantity of TBs of the one multi-TB alternate transmission.

11. The method according to claim 9, further comprising:
sending an HARQ feedback of one of the received one or more TBs by using a predetermined subframe after receiving the one or more TBs issued by using the one multi-TB alternate transmission.

12. A data transmission apparatus, comprising: a processor; and a memory storing an executable program, wherein the executable program, when is executed by the processor, causes the apparatus to perform:
determining configuration information of one or more multi-transmission block (TB) alternate transmissions according to a hybrid automatic repeat request (HARQ) bundling configuration; and
using the one or more multi-TB alternate transmissions to send one or more TB on the basis of the configuration information;
wherein the executable program, when is executed by the processor, further causes the apparatus to perform:
determining a duplex mode of user equipment; and
determining a quantity of TBs of one multi-TB alternate transmission of the one or more multi-TB alternate transmissions according to a size of a plurality of HARQ feedbacks bound to a same physical uplink control channel (PUCCH) resource in response to determining that the user equipment is in a full duplex frequency division duplex (FD-FDD) mode and the HARQ bundling configuration indicates that the plurality of HARQ feedbacks are bound to the same PUCCH resource to be transmitted.

13. A non-transitory computer-readable storage medium, storing an executable program, wherein the executable program, when is executed by the processor, causes an apparatus to perform steps of the data transmission method according to claim 1.

14. The method according to claim 10, further comprising:
sending an HARQ feedback of the one or more received TBs by using a predetermined subframe after receiving the one or more TBs issued by using the one multi-TB alternate transmission.

15. A data transmission apparatus, comprising a processor; and a memory storing an executable program, wherein the executable program, when is executed by the processor, causes the apparatus to perform steps of the data transmission method according to claim 7.

16. A non-transitory computer-readable storage medium, storing an executable program, wherein the executable program, when is executed by the processor, causes an apparatus to perform steps of the data transmission method according to claim 7.

* * * * *

UNITED STATES PATENT AND TRADEMARK OFFICE
CERTIFICATE OF CORRECTION

PATENT NO. : 12,244,426 B2
APPLICATION NO. : 17/774087
DATED : March 4, 2025
INVENTOR(S) : Qin Mu It is certified that error appears in the above-identified patent and that said Letters Patent is hereby corrected as shown below:

In the Specification

In Column 4, Line 3, delete "may the" and insert -- may be the --, therefor.

In Column 5, Line 43, delete "step 102:" and insert -- Step 102: --, therefor.

In Column 9, Line 53, delete "TB 2" and insert -- TB2 --, therefor.

In Column 11, Line 21, delete "feed back" and insert -- feedback --, therefor.

In Column 16, Line 7, delete "TB 2" and insert -- TB2 --, therefor.

In Column 17, Line 39, delete "feed back" and insert -- feedback --, therefor.

In Column 18, Line 41, delete "follows." and insert -- follows: --, therefor.

Signed and Sealed this
Thirteenth Day of May, 2025

Coke Morgan Stewart
*Acting Director of the United States Patent and Trademark Office*